United States Patent
Schrader et al.

(10) Patent No.: US 7,423,958 B2
(45) Date of Patent: *Sep. 9, 2008

(54) TRANSMITTER FOR TRANSMITTING SIGNALS OVER RADIO CHANNELS AND METHOD FOR TRANSMITTING SIGNALS OVER RADIO CHANNELS

(75) Inventors: Marc Schrader, Hannover (DE); Mirko Lochau, Hildesheim (DE); Lars Harms, Hildesheim (DE); Nabil Hentati, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 962 days.

This patent is subject to a terminal disclaimer.

(21) Appl. No.: 10/168,894

(22) PCT Filed: Dec. 16, 2000

(86) PCT No.: PCT/DE00/04507

§ 371 (c)(1),
(2), (4) Date: Feb. 24, 2003

(87) PCT Pub. No.: WO01/48910

PCT Pub. Date: Jul. 5, 2001

(65) Prior Publication Data
US 2003/0156657 A1    Aug. 21, 2003

(30) Foreign Application Priority Data
Dec. 23, 1999   (DE) ................. 199 62 340

(51) Int. Cl.
*H04J 9/00* (2006.01)
(52) U.S. Cl. .............. 370/204; 370/205; 370/206; 375/297

(58) Field of Classification Search ............... 370/216, 370/242, 249, 332, 206, 204, 205; 375/297, 375/267, 295, 296, 298, 308, 260, 261; 330/151, 330/149; 455/114.3
See application file for complete search history.

(56) References Cited

U.S. PATENT DOCUMENTS
4,329,655 A    5/1982    Nojima et al.
(Continued)

FOREIGN PATENT DOCUMENTS
DE    33 07 309    9/1984
WO    WO 99 45640    9/1999

OTHER PUBLICATIONS

"Linearisation of RF multicarrier amplifiers using Cartesian feedback" by Johansson et al Electronics Letters vol. 30 Jul. 7, 1994 No. 14, pp. 1110-1112.*

(Continued)

*Primary Examiner*—Edan Orgad
*Assistant Examiner*—Chuong Ho
(74) *Attorney, Agent, or Firm*—Kenyon & Kenyon LLP

(57) ABSTRACT

A transmitter for sending signals over wireless channels and a method of sending signals over wireless channels are described. The transmitter and the method are used to determine a transfer characteristic of an amplifier (8) in the transmitter. Symbols in the OFDM signals to be transmitted are multiplied by test signals at predefined points in time to compare the OFDM symbol, which has been multiplied by the test signal, upstream and downstream from the amplifier to determine the transfer characteristic of the amplifier (8). This transfer characteristic of the amplifier (8) is used by a predistorter (4) to predistort the signals according to this transfer characteristic. The test signal, which is generated by a signal generator (13), is input into a symbol of the fast information channel, the test signal having an amplitude which drives the multiplied symbol into the saturation range of the amplifier (8) with regard to its amplitude.

10 Claims, 2 Drawing Sheets

U.S. PATENT DOCUMENTS

| | | | | |
|---|---|---|---|---|
| 4,615,040 | A | * | 9/1986 | Mojoli et al. ............... 375/267 |
| 5,164,678 | A | * | 11/1992 | Puri et al. .................. 330/149 |
| 5,262,734 | A | * | 11/1993 | Dent et al. ................... 330/52 |
| 5,877,653 | A | * | 3/1999 | Kim et al. .................. 330/149 |
| 6,166,601 | A | * | 12/2000 | Shalom et al. ............. 330/151 |
| 6,252,912 | B1 | * | 6/2001 | Salinger .................... 375/278 |
| 6,771,708 | B1 | * | 8/2004 | Suga et al. ................. 375/278 |
| 2002/0021764 | A1 | * | 2/2002 | Posti ......................... 375/296 |
| 2002/0079965 | A1 | * | 6/2002 | Maniwa et al. ............. 330/149 |
| 2003/0058960 | A1 | * | 3/2003 | Lee ........................... 375/297 |
| 2006/0067426 | A1 | * | 3/2006 | Maltsev et al. ............. 375/297 |

OTHER PUBLICATIONS

M. Schrader and N. Hentati, "Reduktion von Ausserbandstrahlung von Sendestufen im DAB-COFDM-System [Reducing out-of-band radiation of transmitter stages in the DAB-COFDM system]," OFDM Fachgespräche, Sep. 1998, Braunschweig (conference).

\* cited by examiner

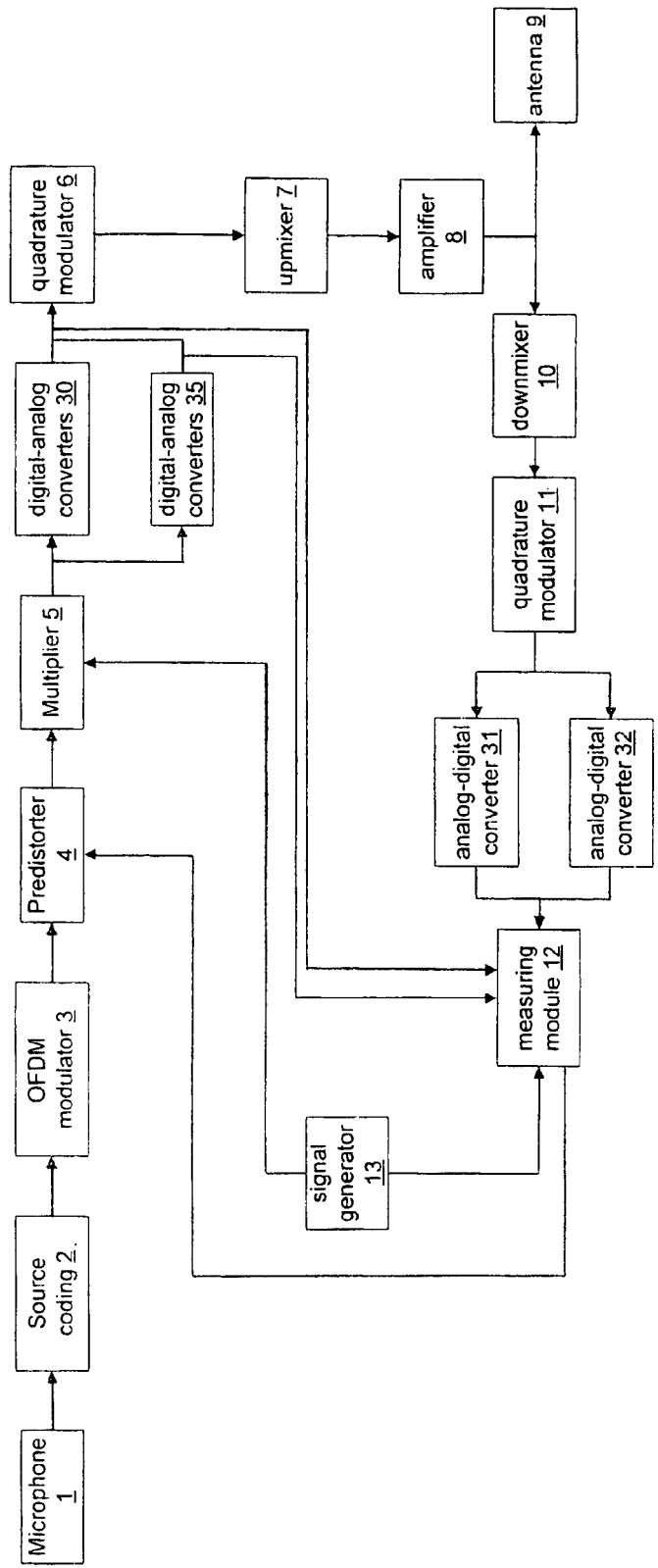

TRANSMITTER FOR TRANSMITTING SIGNALS OVER RADIO CHANNELS AND METHOD FOR TRANSMITTING SIGNALS OVER RADIO CHANNELS

FIELD OF THE INVENTION

The present invention relates to a transmitter for sending signals over wireless channels and a method of sending signals over wireless channels.

BACKGROUND INFORMATION

Predistortion of OFDM signals (OFDM=orthogonal frequency division multiplex), specifically according to the transfer properties of the amplifier in the transmitter, is described in M. Schrader and N. Hentati "Reduktion von Außerbandstrahlung von Sendestufen im DAB-COFDM-System (Reducing out-of-band radiation of transmitter stages in the DAB-COFDM system)," OFDM Fachgespräche (conference), September 1998, Braunschweig, (printed in the conference volume). This may be required because OFDM signals may require good linearity of the amplifier in the transmitter due to the great difference between the large and small amplitudes that may occur in OFDM signals, i.e., the dynamics or amplitude variance, because all OFDM signal amplitudes may be required to be amplified linearly. The article referenced above describes a feedback system for predistortion, a portion of the amplified OFDM signal being fed back and compared with a buffered OFDM signal to determine the transfer properties of the amplifier in the transmitter. The buffered OFDM signal is the OFDM signal which is then amplified and fed back. Since the properties of the OFDM signal may be similar to those of a noise signal, this may require high-quality synchronization of the buffered OFDM signal and the amplified OFDM signal.

SUMMARY OF THE INVENTION

According to an exemplary transmitter and/or exemplary method of the present invention for sending signals over wireless channels, a test signal may be multiplied by the OFDM signal to determine the transfer properties of the amplifier. In this manner, the complete transfer properties of the amplifier may be determined, and therefore better predistortion of the OFDM signals may be possible.

The test signal may be input only at preset intervals so that impairment of the signal transmitted due to multiplication by the test signal may be minimized.

The exemplary transmitter and/or exemplary method may be refined and improved.

Differential phase modulation, such as, for example, differential quadrature phase shift keying, may be used as the modulation method for imposing information on the OFDM signals. Consequently, the receiver may not be required to determine an absolute phase but instead may only be required to determine the phase shift between the signals for demodulation.

In addition, the test signal may be a constant signal which drives the OFDM signal into the saturation range of the amplifier due to the multiplication. Therefore, the transmission characteristic may be determined even in the nonlinear range of the amplifier.

A multiplier may multiply the test signal by a certain symbol in the signals, so that synchronization in the symbol clock pulse of the signals may be possible on the one hand, while on the other hand a symbol may be selected whose loss does not have any important consequences for the receiver.

The test signal in DAB may be multiplied by a fast information channel symbol, because the loss of the fast information channel symbol may not be important for the receiver, because data concerning the data structure in the main service channel may be stored in the fast information channel symbol, and this data may be repeated frequently anyway.

BRIEF DESCRIPTION OF THE DRAWINGS

FIG. 1 shows a block diagram of an exemplary OFDM transmitter according to the present invention.
FIG. 2 shows an exemplary DAB frame.

DETAILED DESCRIPTION

Figure 3:
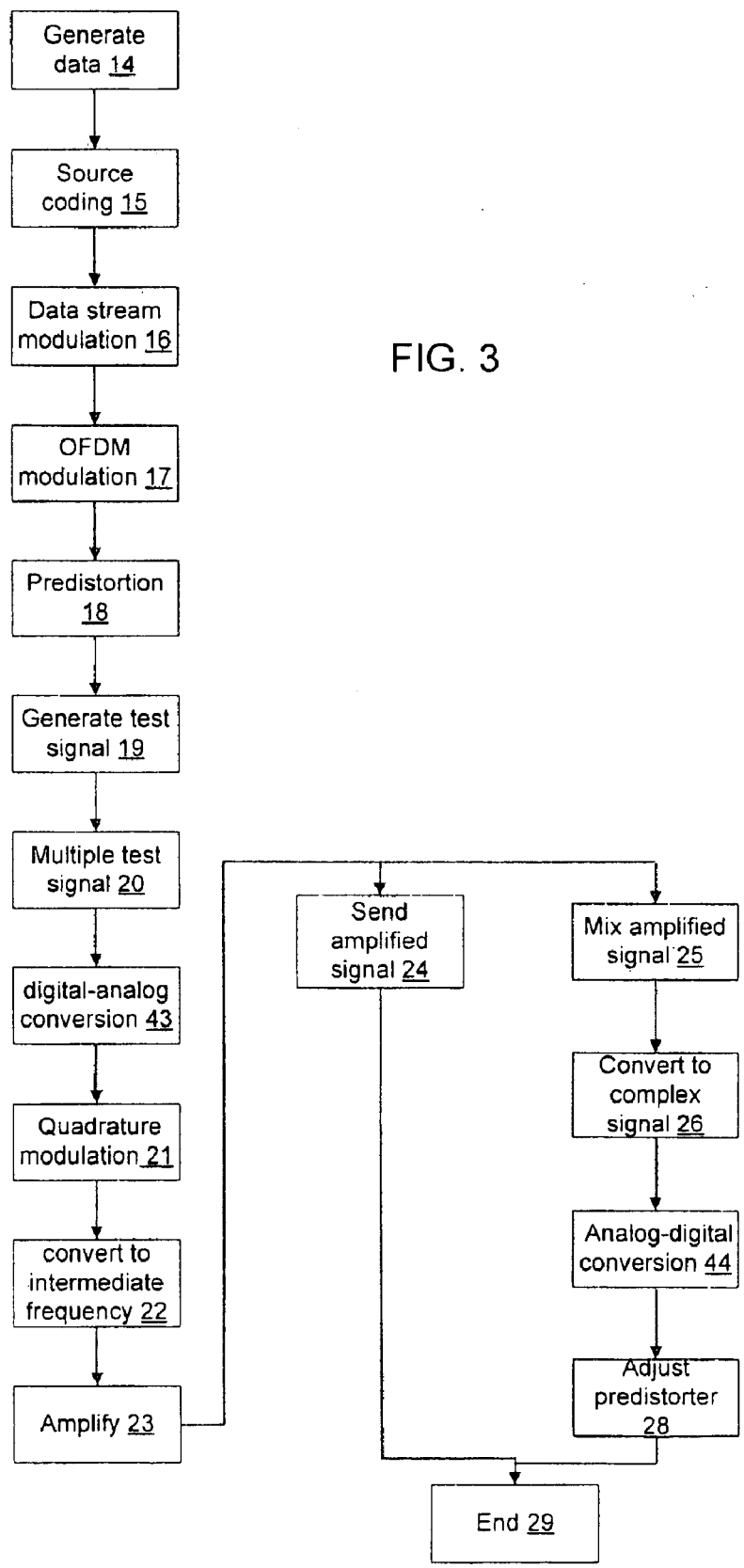
FIG. 3 shows an exemplary method according to the present invention for sending signals over wireless channels.

Orthogonal frequency division multiplex (OFDM) is a conventional method for mobile wireless applications. In OFDM, signals to be transmitted may be distributed among multiple subcarriers, each subcarrier having a certain frequency spacing from the others, so that signals distributed among the subcarriers may not cause mutual interference. This may be described as orthogonal.

OFDM may therefore be used for digital wireless transmission methods, in particular for mobile reception, e.g., via car radios, including DAB (Digital Audio Broadcasting), DVB (Digital Video Broadcasting) and DRM (Digital Radio Mondial). These wireless transmission methods may profit from the feature of OFDM that, when frequency-selective damping occurs, only a small portion of the wireless signal transmitted may have interference, because the wireless signal has been distributed among a plurality of frequencies, and only one signal component transmitted at a frequency at which there is strong damping may be affected by interference. The signal component affected by interference may be corrected by error detecting and correcting measures. Such error detecting and correcting measures include error detecting and correcting codes such as block codes or convolution codes.

In OFDM, after the signals to be transmitted have been distributed among the subcarriers, they may be added up in the time interval of the distributed signals, and the amplitudes may be added up in such a manner that the amplitudes of the superimposed signal assume a very large value at certain points in time and assume a very small value at other points in time. This may depend on the phase relationship of the signal components being added, namely whether the signals are added constructively or destructively. An amplifier in the transmitter may have the function of amplifying all amplitudes equally, so there may be no nonlinear distortion.

Predistortion may be used to take into account the transfer properties of the amplifier in the transmitter. To determine a transfer characteristic of the amplifier, a signal amplified by the amplifier may be compared with the original signal. The OFDM signal may be a challenge because it may be difficult to synchronize the original OFDM signal with the amplified OFDM signal due to the uncorrelated sequence of amplitudes that may occur due to the addition of individual signal components.

For amplification of OFDM signals, the amplifier may be operated only in the linear range. If a signal transmitted at a certain frequency is applied to a nonlinear characteristic curve, e.g., that of the amplifier, frequency components may occur at multiples of this specific frequency. If these multiples are outside the transmission frequency spectrum, this may be referred to as out-of-band radiation because signal energy outside the available spectrum may then be transmitted. Since a receiver may filter out the out-of-band radiation, this signal energy may be lost for the purposes of signal transmission. In addition, the out-of-band radiation may interfere with other transmission systems used at frequencies at which this out-of-band radiation occurs.

If there are new frequency components within the available transmission frequency spectrum, unwanted signal components may be demodulated in the receiver. This may result in crosstalk. This may significantly worsen the signal quality and thus may also impact the bit error rate of the received signal. The bit error rate may indicate how many bits per received bit are detected incorrectly. Error detecting codes may be used to determine the bit error rate. After distribution of the signals to be transmitted among the subcarriers, the OFDM signal may be like a noise signal, individual amplitude peaks being capable of driving the amplifier of the transmitter into the nonlinear range. Therefore, predistortion of the OFDM signal may be required so that the characteristic curve of the amplifier may not have any effect on the spectrum of the OFDM signal.

FIG. 1 shows a block diagram of an exemplary OFDM transmitter according to the present invention. A data source 1 here generates data. Data source 1 here is a microphone having electronic components connected to it for amplifying and digitizing speech signals converted by the microphone. Microphone 1 converts sound waves into analog electric signals, which are then amplified and digitized by electronic components connected to the microphone. The digital data stream generated from these speech signals goes to a source coding 2. This source coding 2 is performed by a processor.

Source coding 2 reduces the number of bits generated from the speech signals by having source coding 2 remove redundancy from the digital data stream. By using psychoacoustic models, data not required for playback of the speech signals is removed from the speech signals. After source coding 2, the data stream thus reduced is sent to an OFDM modulator 3. Moreover, in addition to speech signals, other data such as text data, image data and video data may also be transmitted. Source coding is then performed specifically for the given type of data.

OFDM modulator 3 first performs a differential phase modulation of the signals to be transmitted. Differential quadrature phase shift keying or DQPSK is used for this purpose. DQPSK is a digital modulation method in which the signal phase shift is modulated. The phase shift in a certain interval of time, i.e., per bit, is used as the modulation signal. A phase shift of +90° is used here. Differential modulation methods may have the advantage that no absolute value need be determined in the receiver to demodulate the signals because the information transmitted is contained in the phase shift of the signals transmitted. A bit string of 110 thus results in a phase shift of +90° each for the two ones and −90° for the zero.

In addition to DQPSK, other differential or nondifferential phase modulation methods may also be used. However, amplitude or frequency modulation methods may also be used here.

DQPSK may be a complex modulation method, because the bits of the bit stream carried in OFDM modulator 3 are mapped in phase shifts. If a phase of a signal is shifted, a complex plane is used for the graphic representation of the signals as vectors, a real component being plotted on the abscissa and an imaginary component on the ordinate. A signal having a phase of >0 is rotated counterclockwise by this phase, starting from the abscissa, in the complex plane. If a 90° phase shift is performed four times, this leads back to the starting signal. Thus, four modulation states which may be differentiated mutually may be possible with DQPSK.

In addition to differential QPSK, OFDM modulator 3 distributes the signals to be demodulated among the subcarriers, resulting in an OFDM signal. A complex signal is obtained as a result of DQPSK performed by OFDM modulator 3, so a first and a second data output of OFDM modulator 3 are connected to a first and a second data input of a predistorter 4 to separately process two components of the signal, the imaginary component and the real component.

Downstream from predistorter 4, the predistorted signals arrive at a multiplier 5. The signals are still complex, so that two data outputs lead from predistorter 4 to multiplier 5. Multiplier 5 multiplies a test signal by the predistorted OFDM signal. Multiplier 5 therefore multiplies the test signal by the OFDM signal at certain points in time, so that the test signal alters the OFDM signal at these points in time. These points in time are preset, e.g., every hour or once a day. This measurement may be performed before the actual operation of the transmitter according to the present invention and may be subsequently continued at the preset points in time during operation of the transmitter.

As an alternative, multiplier 5 may also be used upstream from predistorter 4 if predistorter 4 is loaded with a set of constant values.

In DAB, a zero symbol is provided for synchronization at the start of the DAB frame with which the DAB signals are transmitted. FIG. 2 shows a DAB frame. A synchronization channel 40 at the start of the DAB frame has the zero symbol. In a fast information channel 41, information regarding the multiplex and other service information is transmitted. A main service channel 42 has the data to be transmitted, such as audio programs and/or multimedia data.

The test signal is multiplied by fast information channel 41, so that no other data transmitted in the DAB frame may be overwritten. It may be acceptable that fast information channel 41 is altered with the test signal, because the information contained in the fast information channel may not be absolutely required for the receiver and may be repeated frequently anyway. The test signal, which is also complex, is generated by a signal generator 13. Signal generator 13 has two data inputs leading to multiplier 5. Multiplier 5 thus receives the test signal from signal generator 13 over its third and fourth data inputs. Signal generator 13 is a d.c. voltage source.

The test signal may need only fulfil the requirement that it drives the OFDM signal into the saturation range of the amplifier. Furthermore, the test signal may have the time length of at least one symbol or multiples of a symbol. In addition, the test signal is synchronized with an OFDM symbol in the OFDM signals, so that two symbols are not impaired by the test signal. The test signal is thus a d.c. voltage signal which acts like a constant factor by which the OFDM signal is multiplied.

The OFDM signal having the symbol by which the test signal has been multiplied goes as a complex signal from multiplier 5 over the first and second data outputs to digital-analog converters 30 and 35 which convert the portions of the complex signal into analog signals which then arrive in a quadrature modulator 6. The complex OFDM signal having the OFDM symbol which was multiplied by the test signal is converted into a real signal using quadrature modulator 6. Complex signal y(t) is described mathematically by the following equation:

$$y(t)=a(t)+jb(t)$$

and is converted into a real signal x(t) by the following procedure:

$$x(t) = a(t)\cos(\omega t) - b(t)\sin(\omega t)$$

where ω is a frequency by which the OFDM signal is converted into an intermediate frequency by upmixing.

Quadrature modulator 6 is followed by upmixer 7, the real OFDM signal being converted into the intermediate frequency range. Upmixer 7 therefore has an oscillator to generate the frequency by which the OFDM signal is to be shifted.

The OFDM signal converted into the intermediate frequency is sent to amplifier 8 after upmixer 7, or it is amplified according to the transfer characteristic of amplifier 8. After amplifier 8, the OFDM signals go first to an antenna 9, which transmits them, and also to a downmixer 10, which reduces the amplified signal back to a baseband. This component of the OFDM signal is thus fed back. This component may be very small in comparison with the component that is sent; for example, it may amount to less than one percent, because most of the signal energy is used for transmitting the OFDM signals. After feedback, the OFDM signal is output with a directional coupler. The directional coupler has two lines which are positioned so as to permit electromagnetic output of signal energy from one line to the other line.

The baseband is the frequency range in which data is generated. After downmixer 10, a complex signal is generated again from the real signal in a quadrature modulator, so that quadrature modulator 11 has two data outputs, one analog-digital converter 31 and 32 connected to each to digitize the complex signal components. The digitized signals then go to measuring module 12.

At its first and second data inputs, measuring module 12 receives the OFDM signal having the symbol multiplied by the test signals. Furthermore, this OFDM signal has been amplified by amplifier 8. At its third and fourth data inputs, measuring module 12 receives the OFDM signal having the OFDM symbol multiplied by the test signal from first and second data outputs of multiplier 5. This symbol is stored temporarily for this purpose. The OFDM signal modified in this manner and sent from multiplier 5 to measuring module 12 is stored temporarily in measuring module 12 until the same OFDM signal having the symbol multiplied by the test signal is sent from quadrature modulator 11 to measuring module 12. This permits a comparison of the OFDM symbol which was multiplied by the test signal upstream and downstream from amplifier 8.

The transfer characteristic of amplifier 8 is determined by comparing the absolute value and phase dependence of the input amplitudes. To perform the synchronization, measuring module 12 is connected at its fifth data input to a third data output of signal generator 13, so that measuring module 12 is informed when a test signal is generated. Measuring module 12 has a data output which is connected to a second data input of predistorter 4, so that predistorter 4 predistorts the signal coming from the OFDM modulator according to the transfer characteristic of amplifier 8 which has been sent. Measuring module 12 operates only when a test signal is multiplied by an OFDM signal. If the test signal has not been multiplied by the OFDM signal, multiplier 5 allows the OFDM signal to pass unchanged.

FIG. 3 shows a method according to the present invention for transmitting signals over wireless channels. Data is generated in method step 14. This occurs via of a microphone, as described above. However, other data sources may also be possible, including a computer with a keyboard. Source coding is performed in method step 15, with redundancy which is not required for reconstruction of speech data in the receiver being removed from the speech signals. In method step 16, modulation of the data stream is performed after source coding 15, differential phase modulation being performed here, as described above.

In method step 17, the data stream is distributed among various subcarriers by OFDM modulation. In method step 18, predistortion is performed according to the transfer characteristic of amplifier 8. A test signal is generated in method step 19. In method step 20, the test signal is multiplied by a symbol of the predistorted OFDM signal at certain points in time, in particular multiplying it by a symbol of the fast information channel. A digital-analog conversion of the OFDM signal with the test signal is performed in method step 43. Quadrature modulation is performed in method step 21 to obtain a real signal from the complex signal.

The real signal is converted to the intermediate frequency in method step 22. The converted signal is amplified by amplifier 8 in method step 23. In method step 24, the amplified signal is sent, while a portion of the amplified signal is mixed back down in method step 25 and converted back to a complex signal by a quadrature demodulator in method step 26. Analog-digital conversion of the complex signal is performed in method step 44, so that a comparison of the OFDM symbol that has been multiplied by the test signal is performed upstream and downstream from amplifier 8 to determine the transfer characteristic of amplifier 8. If no test signal is multiplied, the method ends here. In method step 28, the predistorter is adjusted according to the transfer characteristic of amplifier 8 thus determined. The method ends with method step 29.

Here again, as an alternative, multiplication may be performed before predistortion, as described above.

What is claimed is:

1. A transmitter for sending signals over wireless channels, comprising:
   a modulator for modulating signals to be sent and for distributing modulated signals among a plurality of subcarriers;
   a predistorter for predistorting the signals distributed among the plurality of subcarriers;
   a signal generator for generating a test signal;
   a multiplier for multiplying the test signal by at least one of the distributed signals and the predistorted signals at predefined time intervals;
   a mixer for converting at least one of the multiplied signals and the predistorted signals from a baseband into an intermediate frequency;
   an amplifier for amplifying the converted signals;
   an antenna for sending a first portion of the amplified signals;
   a mixer for mixing a second portion of the amplified signals down from the intermediate frequency to the baseband; and
   a measuring module for comparing the mixed-down signals with the at least one of the multiplied signals and the predistorted signals to determine transfer properties of the amplifier and to notify the predistorter of the transfer properties of the amplifier, wherein the measuring module is configured to compare a test signal in the mixed-down signals with a test signal in the at least one of the multiplied signals and the predistorted signals to obtain the transfer properties of the amplifier, and wherein the predistorter is configured to predistort the signals distributed among the various subcarriers according to the transfer properties of the amplifier.

2. The transmitter according to claim 1, wherein the multiplier multiplies the test signal upstream from the predistorter by the distributed signals at the predefined time intervals.

3. The transmitter according to claim 1, wherein the modulator performs a differential phase modulation.

4. The transmitter according to claim 3, wherein the modulator performs a differential quadrature phase shift keying.

5. The transmitter according to claim 1, wherein the signal generator generates the test signal as a d.c. voltage signal in the predefined intervals, an amplitude of the d.c. voltage signal driving the amplifier into saturation.

6. The transmitter according to claim 5, wherein the multiplier multiplies the test signal by a predetermined symbol in the at least one of the distributed signals and the predistorted signals.

7. A method of sending signals over wireless channels, comprising:

modulating the signals to be sent;

distributing the modulated signals among subcarriers;

predistorting the distributed signals according to transfer properties of an amplifier;

converting the predistorted signals from a baseband into an intermediate frequency;

amplifying the converted signals;

sending a first portion of the amplified signals over the wireless channels;

converting a second portion of the amplified signals from the intermediate frequency to the baseband;

comparing the predistorted signals with the signals converted to the baseband to determine the transfer properties of the amplifier; and sending information regarding the transfer properties of the amplifier to a predistorter;

wherein in determining the transfer properties of the amplifier, test signals are generated and multiplied by at least one of the distributed signals and the predistorted signals, and a test signal in at least one of the multiplied signals and the predistorted signals is compared with a test signal of the signals amplified and converted to the baseband.

8. The method according to claim 7, wherein the test signals are multiplied by the distributed signals upstream from the predistorter.

9. The method according to claim 7, wherein the test signals include a test signal having an amplitude such that the amplifier is at least fully driven by the test signal.

10. The method according to claim 9, wherein the test signal is multiplied by a fast information channel symbol.

* * * * *